United States Patent

Tsubouchi

[11] Patent Number: 4,604,944
[45] Date of Patent: Aug. 12, 1986

[54] HOUSING OF PNEUMATIC BOOSTER DEVICE

[75] Inventor: Kaoru Tsubouchi, Toyota, Japan

[73] Assignee: Aisin Seiki Kabushiki Kaisha, Kariya, Japan

[21] Appl. No.: 744,566

[22] Filed: Jun. 14, 1985

[30] Foreign Application Priority Data

Jun. 22, 1984 [JP] Japan .......................... 59-093931[U]

[51] Int. Cl.$^4$ .............................................. F16J 3/00
[52] U.S. Cl. .................................. 92/98 D; 92/98 R; 92/128; 220/4 B; 220/319; 403/338
[58] Field of Search .................... 92/128, 165 PR, 169; 220/4 B, 319; 285/403; 403/338

[56] References Cited

U.S. PATENT DOCUMENTS 2,616,587 11/1952 Petch ........................................ 220/61
3,030,127 4/1962 Stelzer ..................................... 285/91
4,296,680 10/1981 Ohta et al. ............................. 92/98 D

FOREIGN PATENT DOCUMENTS 57-164869 10/1982 Japan ................................. 92/98 D

*Primary Examiner*—Samuel Scott
*Assistant Examiner*—Allen J. Flanigan
*Attorney, Agent, or Firm*—Burns, Doane, Swecker and Mathis

[57] ABSTRACT

A pneumatic booster device having an elliptical housing is formed of two stamped metal sections having mating flange and opening portions, the two sections being joined in a simple, effective, easily diassembleable manner without the use of standard nut and bolt fasteners. The flange portion and opening portion are formed with mating abutting portions for limiting the depth of insertion of the second shell into the first shell, and the flange portion of the second shell is formed with a plurality of notches extending from the outer periphery toward the center which are arranged circumferentially and spaced from one another; the opening portion of the first shell is provided with a plurality of projecting pawls for clamping the flange portion of the second shell via a pair of U-shaped lock members disposed adjacent to the outside of the flange portion; the pawls are aligned with the notches in the axial direction of the housing and made smaller than the notches; gaps are left between the inner periphery of the pair of lock members and the second shell and between the opposite ends of both lock members for permitting each lock member to slide a given extent; each lock member is formed with notches to cancel a locked relation of the lock member with the pawls as the lock member slides the given extent; and a stopper is incorporated for preventing sliding of the lock members in a normal state.

3 Claims, 5 Drawing Figures

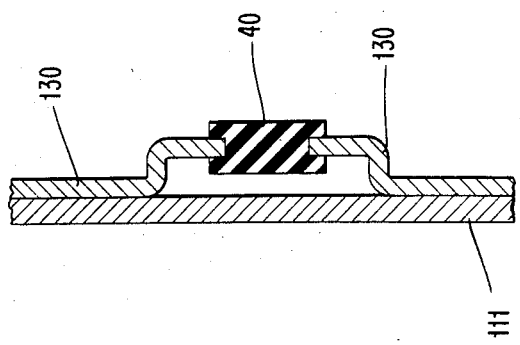
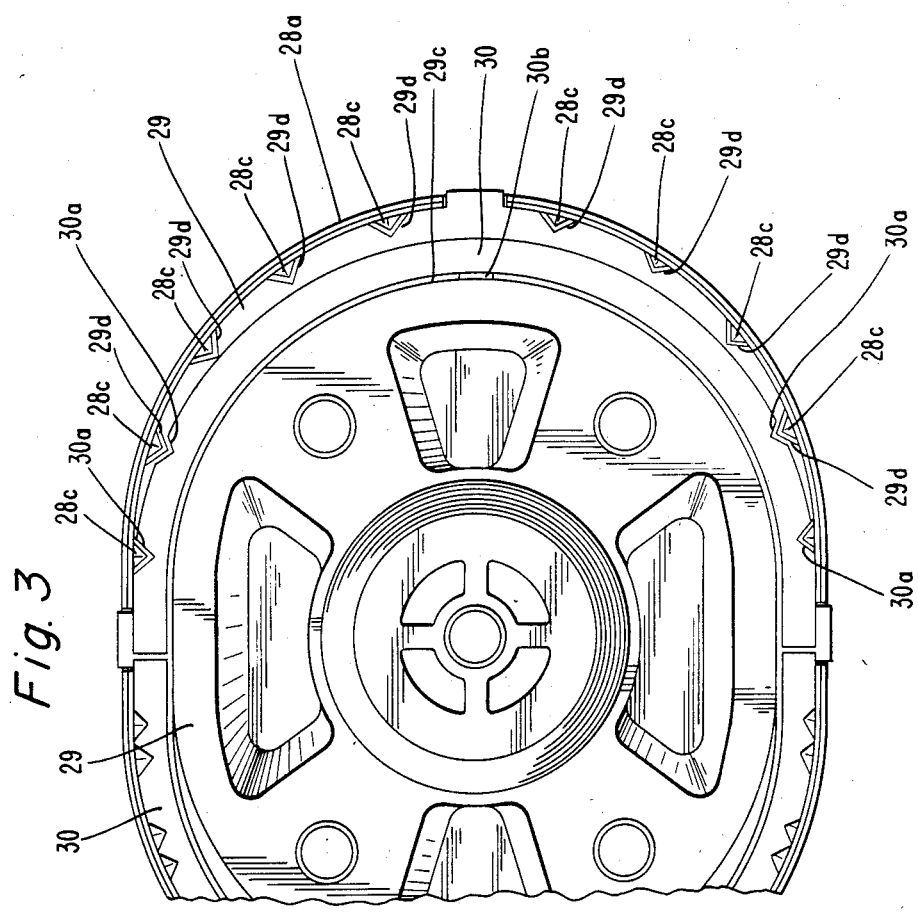

HOUSING OF PNEUMATIC BOOSTER DEVICE

BACKGROUND OF THE INVENTION

1. Field of the Invention

This invention relates to a pneumatic booster device used for reducing a pressure required to step on a brake pedal or clutch pedal of an automobile and, more particularly, to a housing of the pneumatic booster device whose outer peripheral shape is elliptical.

2. Description of the Prior Art

Considering the pneumatic booster device for use in the brake system of the automobile, its housing must be designed so that it can be disassembled and reassembled, because parts, such as diaphragm, accommodated in the housing must be checked at the time of an automobile inspection.

Typical pneumatic booster device widely used nowadays has a housing of circular outer peripheral shape which is composed of a pair of mutually coupled shells that are made by subjecting metallic plates to plastic working. Coupling of such shells is achieved, as disclosed in Japanese Patent Application Laid-Open No. 55-76743, for example, by designing in such a way that one shell is provided with a flange portion which is inserted into an opening portion of the other shell and locked in place, mating abutting portions are formed respectively on the flange portion and on the opening portion of the other shell to limit the depth of insertion of the one shell into the other shell, a plurality of pawls for locking the flange portion of the one shell are provided projectingly on the opening portion of the other shell through calking process, notches are formed in the flange portion of the one shell, each being larger in size than the corresponding pawl of the other shell and becoming opposite to that pawl as the one shell is rotated to a given position with respect to the other shell, and a stopper is incorporated to prevent relative rotation of both shells in a normal state.

On the other hand, taking account of limitations of space where the pneumatic booster device is to be accommodated, a device whose housing is made elliptical in outer peripheral shape was recently proposed and put to practical use, as disclosed in Japanese Utility Model Application Laid-Open No. 58-22369 and "Jidosha Gijutsu" Jidosha Gijutsu Kai, Vol. 37, No. 6, 1983, page 622. According to such a type having a housing of elliptical outer peripheral shape, because a coupling mechanism of both shells cannot be made identical to that of the type whose housing is circular in outer peripheral shape, flange portions are formed on the outer peripheries of opening portions of both shells, both flange portions are secured by a number of bolts, and, in relation to such securing mechanism, each shell is formed of a casting.

However, because of being formed by a casting, both shells are thick, and their flange portions are made wide for the purpose of being secured by bolts; thus, the conventional device is large in size and weighty in taking into account the relative size of the area for applying a unit difference of pressure to a power piston. Further, because a number of bolts are used, it takes much time for assembly and disassembly, thereby giving rise to high costs.

SUMMARY OF THE INVENTION

In view of the foregoing prior art, the present invention intends to make the structure of a housing, configured to the form of an ellipse in outer peripheral shape, similar to that of a housing of circular in outer peripheral shape, thereby to reduce the housing in size and weight in comparison with the conventional type of the same shape and shorten the time required for assembly and disassembly.

According to the present invention, a housing of a pneumatic booster device comprises a first shell made by subjecting a metallic plate to plastic working, and a second shell made also by subjecting a metallic plate to plastic working and provided with a flange portion which is inserted in an opening portion of the first shell and clampled in place, and characterized in that on the flange portion of the second shell and on the opening portion of the first shell, mating abutting portions are formed for limiting the depth of insertion of the second shell into the first shell; in the flange portion of the second shell a plurality of notches extending from the outer periphery toward the center are formed which are distributed circumferentially and spaced from one another; on the opening portion of the first shell a plurality of projecting pawls are provided for clamping the flange portion of the second shell via a pair of U-shaped lock members disposed adjacent to the outside of the flange portion; the pawls being aligned with the notches in the axial direction of the housing and made smaller than the notches. Between the inner periphery of the pair of lock members and the second shell and between opposite ends of both lock members, gaps are left for permitting the lock members to slide a given extent; in each of the lock members notches are formed to cancel a locked relation of the lock member with the pawls as each lock member slides a given extent; and a stopper is incorporated for preventing sliding of the lock members in a normal state.

According to the present invention featuring the foregoing structure, an integrally coupled relation of both shells is maintained in the normal state by abutment at the mating abutting portions of both shells and an abutting relationship through the pawls of the first shell—lock members—flange portion of the second shell. On the other hand, disassembling of both shells is achieved by (1) removing the restriction of sliding imposed by the stopper from the lock members, (2) forcing the lock members to slide a given extent thereby causing the notches formed in the lock members to oppose to the pawls of the first shell in the axial direction of the booster device, and (3) moving the second shell outside the first shell thereby causing the pawls of the first shell to go successively through the notches of the lock members and the notches in the flange portion of the second shell.

As will be appreciated from the foregoing, the present invention does not use bolts to couple both shells, and so, can reduce the time required for assembly and disassembly in comparison with the conventional structure. Further, because both shells are made by subjecting metallic plate to plastic working, the present invention can make the housing thin in comparison with the prior art, and make it into a small, light body in comparison with the prior art, because of no use of bolts.

The above and other objects, features and advantages of the present invention will become apparent from the following detailed description of the invention when taken in conjunction with the accompanying drawings, which illustrate a few preferred embodiments of the invention.

BRIEF DESCRIPTION OF THE DRAWINGS

FIG. 3 is a view to explain a disassembling process;

FIG. 5 is a cross sectional view taken along line V—V in FIG. 4.

DESCRIPTION OF THE PREFERRED EMBODIMENTS

The present invention will now be described with reference to the drawings.

Figure 1:
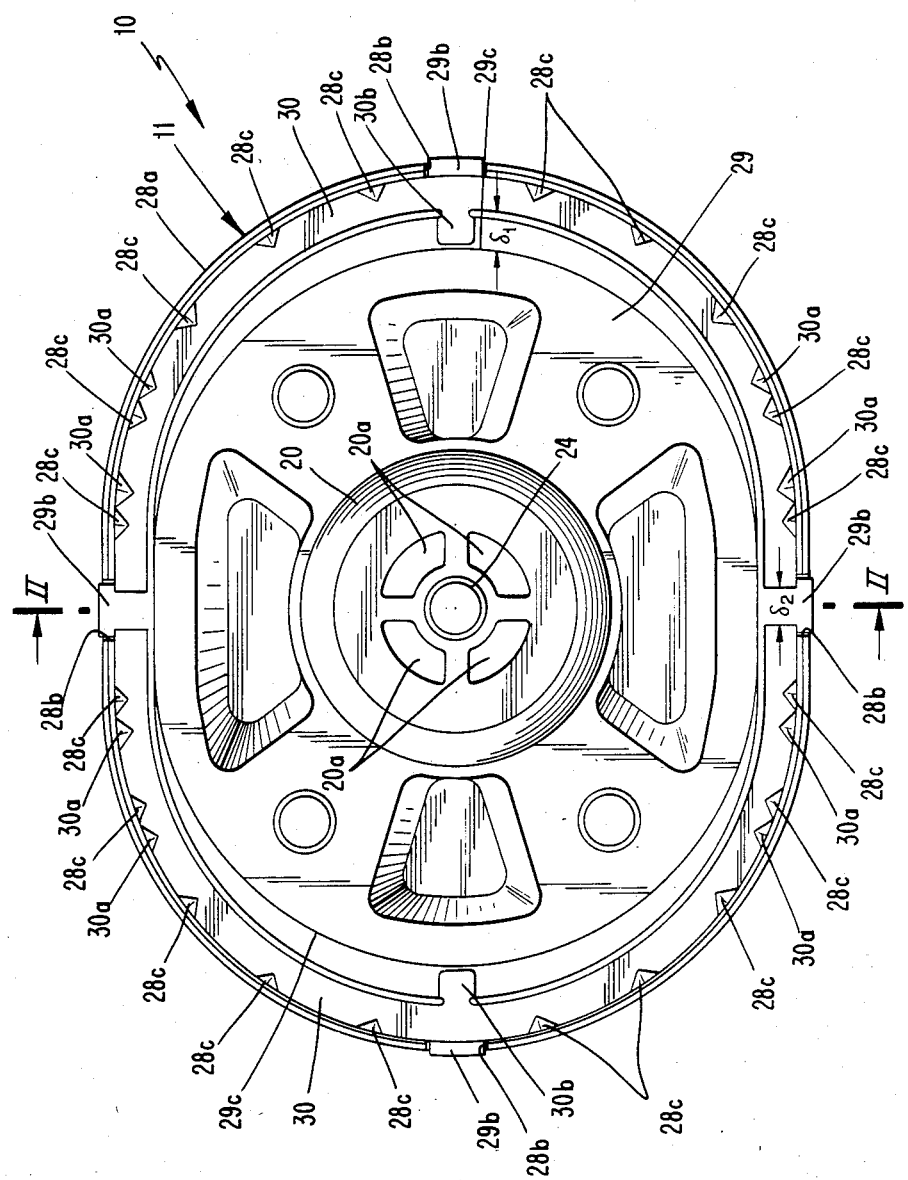
FIG. 1 is a transverse sectional view showing an embodiment of the present invention.
Figure 2:
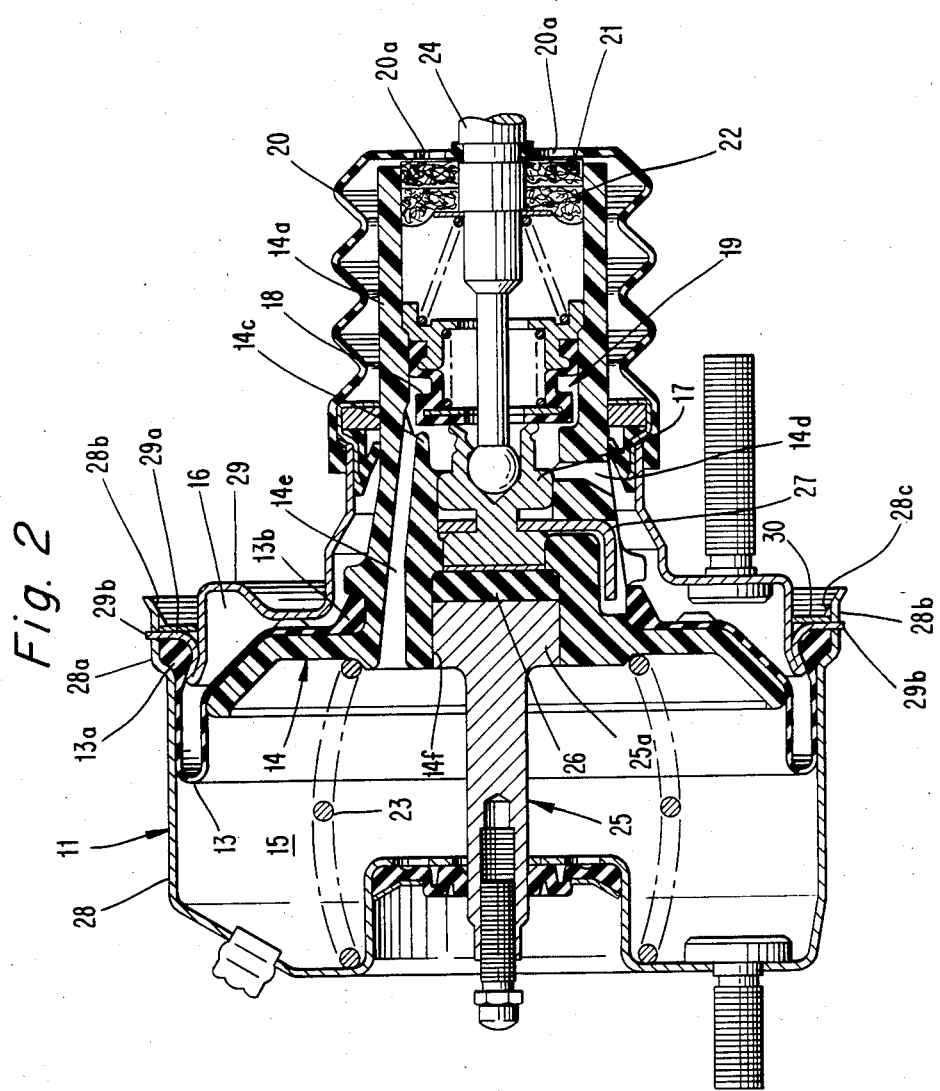
FIG. 2 is a cross sectional view taken along line II—II in FIG. 1.

Describing first an embodiment shown in FIGS. 1 through 3, the inside space of a housing 11 of a pneumatic booster device 10 is divided by a diaphragm 13 made of rubber and a power piston 14 made of resin in two, i.e. a constant-pressure chamber 15 and a variable-pressure chamber 16. As shown clearly in FIG. 1, the outer peripheral shape of the housing 11 is made elliptical, and correspondingly the outer peripheral form each of the diaphragm 13 and power piston 14 is made elliptical. An outer peripheral thick sealing portion 13a of the diaphragm 13 is attached airtightly to the housing 11, whereas its inner peripheral thick sealing portion 13b is attached airtightly to the power piston 14. The power piston 14 has a hollow shaft portion 14a which passes airtightly and slidably through the right end wall of the housing 11, as viewed in FIG. 2 and projects outside the housing. Inside the hollow shaft portion 14a a well-known controlling valve 19 is provided which includes a valve plunger 17 coupled to an input rod 24 linked to a pedal, and a poppet valve 18 spring-urged toward a rear end of the valve plunger 17 and a valve seat 14c of the power piston 14. The controlling valve 19 controls the communication between the atmosphere and the variable-pressure chamber 16 through a hole 20a of a boot 20—air filters 21, 22—the controlling valve 19—a hole 14d of the power piston, and the communication between the variable-pressure chamber 16 and the constant-pressure chamber 15 through the hole 14d of the power piston 14—the controlling valve 19—a hole 14e of the power piston 14. The constant-pressure chamber 15 is connected to an intake manifold of an engine (not shown) through a port bored in the housing 11 and supplied with a negative pressure. Inside the constant-pressure chamber 15 a power piston return spring 23 is provided. An output rod 25 passing airtightly and slidably through the left end wall of the housing 11, as viewed in FIG. 2, has a rear-end large diameter portion 25a which is fitted slidably in a hole 14f of the power piston 14, inside the hole 14f a reaction disc 26 made of rubber being stored. In FIG. 2, reference numeral 27 indicates a key for limiting the extent of sliding of the valve plunger 17 with respect to the power piston 14.

The housing 11 is composed principally of a first shell 28 and a second shell 29. These shells are made by subjecting metallic plates, such as steel plates, to plastic working, an opening portion 28a of the first shell 28 being made a little larger in diameter than other portions. At the outer periphery of the opening portion of the second shell 29 a flange portion 29a is formed which is fitted in the opening portion 28a of the first shell 28, and the outer periphery of the opening portion of the second shell 29 is so designed that it secures the outer peripheral sealing portion 13a of the diaphragm 13 in cooperation with the opening portion 28a of the first shell 28 in the axial and radial directions of the booster device. At the outer periphery of the flange portion 29a of the second shell 29 four tongues 29b are formed, and in correspondence thereto four notches 28b are formed in the opening portion 28a of the first shell 28, in which notches the tongues 29b are carried. These tongues 29b and bottoms of the notches 28b compose mating abutting portions for limiting a depth of insertion of the second shell 29 into the first shell 28.

In order to prevent the flange portion 29a of the second shell 29 from coming off the opening portion 28a of the first shell 28, on the outside of the flange portion 29a of the second shell 29 a pair of U-shaped lock members 30, 30 are provided, and on the opening portion 28a of the first shell 28 a plurality of pawls 28c—28c are integrally formed through calking process. Each lock member 30 is made of steel plate.

In order to render both shells 28, 29 disassemblable, there are left gaps $\delta_1$ between the inner periphery of each lock member 30 and a shoulder portion 29c of the second shell 29, and gaps $\delta_2$ between opposite ends of both lock members 30. Accordingly, by the use of these gaps $\delta_1$, $\delta_2$ each lock member 30 can be slid toward the center of the housing, as viewed in FIG. 1, to the position shown in FIG. 3. Further, in each lock member 30 a desired number of notches 30a—30a are formed to eliminate engagement with the pawls 28c of the first shell 28, as shown in FIG. 3, and in the flange portion 29a of the second shell 29 notches 29d—29d are also formed, which correspond in number to the pawls 28c of the first shell 28, as shown in FIG. 3, to eliminate engagement with that pawls 28c. By means of the foregoing configuration both shells 28, 29 can be disassembled if each lock member 30 is slid from the position shown in FIG. 1 to the position shown in FIG. 3 so as to shift the second shell 29 outside the first shell 28.

In order to prevent sliding of the lock members 30 in the normal state, on each lock member 30 a projection (stopper) 30b is formed which is opposite to the shoulder portion 29c of the second shell 29 with a slight gap left therebetween. These projections 30b are folded when disassembling both casings or shells 28, 29 as shown in FIG. 3, or stretched when reassembling.

Figure 4:
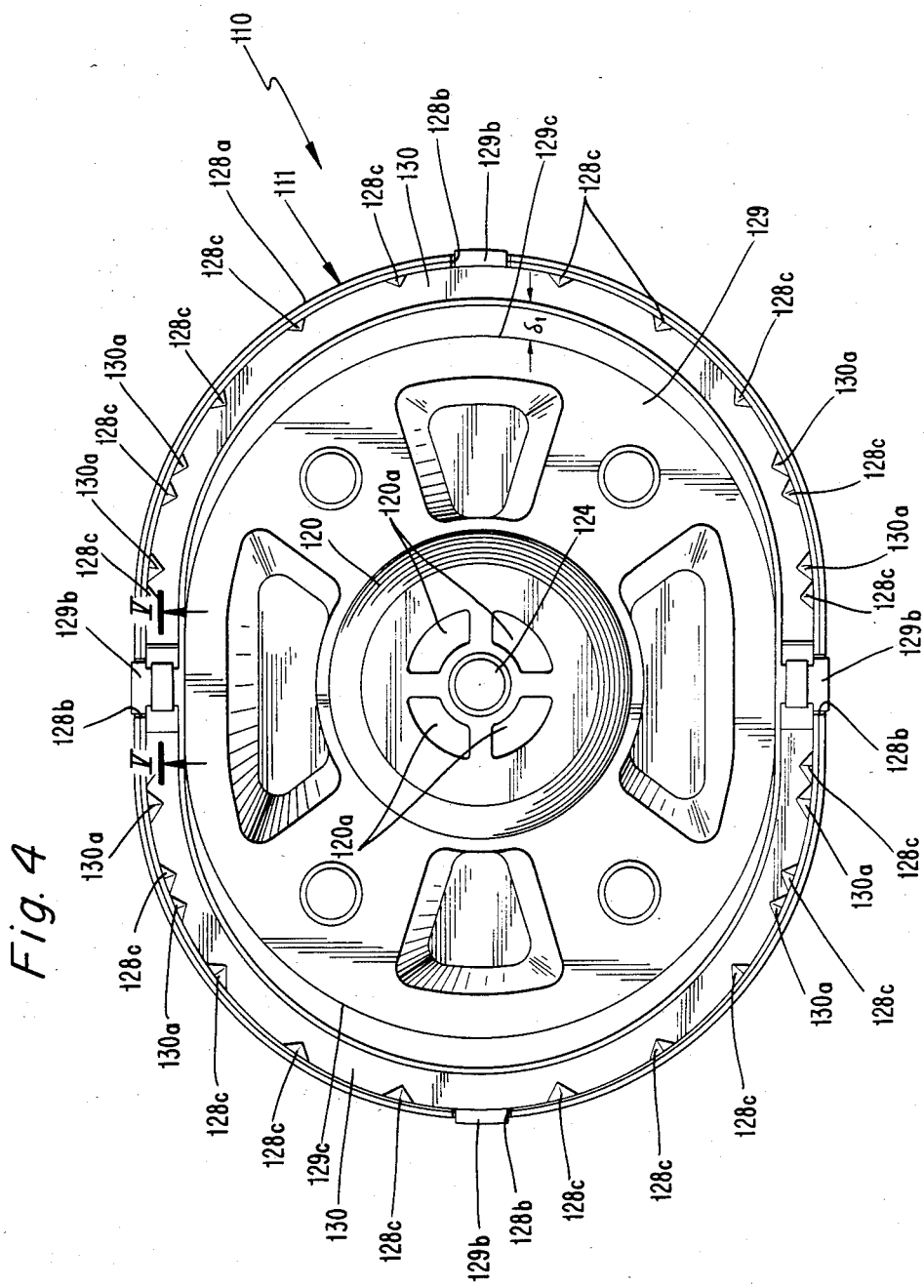
FIG. 4 is a transverse sectional view showing another embodiment of the present invention.

Prevention of sliding of the lock members 30 may be achieved by other means, without use of the projections 30b. Another embodiment of the present invention is shown in FIGS. 4 and 5, in which the identical members to those shown in FIGS. 1 through 3 bear respective reference numerals corresponding to those, except for addition of one hundred. In FIGS. 4 and 5, the opposite end portions of both lock members 130 are so bent as to leave gaps between them and the flange portion 129a of the second shell 129, extending in the axial direction of the booster device, and between the opposite end portions a spacer 40 made of elastic material is interposed which has an H-shaped cross section so that it may fit elastically in between the end portions of respective lock members. Further, the outer peripheral sealing portion 13a of the diaphragm 13 may, as disclosed in Japanese Utility Model Application Laid-Open No. 57-32567, be positioned in the inner part of the device beyond the opening portion 28a of the first shell 28 and secured by both shells in the radial directions of the booster device, i.e. the flange portion 29a of the second shell 29 may be made so as to abut on the end wall of the opening portion 28 of the first shell thereby letting these portions be the mating abutting portions.

As is apparent from the foregoing description, according to the present invention, the housing of the pneumatic booster device whose housing is made elliptical in outer peripheral shape can be made small and light in comparison with the conventional device and the time required for assembly and disassembly can be shortened.

What is claimed is:

1. A housing of a booster device of the type in that the inside space of the housing made elliptical in outer peripheral shape is divided by a diaphragm and a power piston into a constant-pressure chamber and a variable-pressure chamber, comprising a first shell made by subjecting a metallic plate to plastic working, and a second shell made by subjecting a metallic plate to plastic working and provided with a flange portion which is inserted in an opening portion of said first shell and clamped in place, and characterized in that on said flange portion of said second shell and on said opening portion of said first shell, mating abutting portions are formed respectively for limiting a depth of insertion of said second shell into said first shell, in said flange portion of said second shell a plurality of notches extending from the outer periphery toward the center are formed which are distributed circumferentially and spaced from one another, on said opening portion of said first shell a plurality of pawls are provided projectingly for clamping said flange portion of said second shell via a pair of U-shaped lock members disposed adjacent to the outside of said flange portion, said pawls being aligned with said notches in the axial direction of said housing and made smaller than said notches, between the inner periphery of said pair of lock members and said second shell and between opposite ends of both said lock members, gaps are left for permitting said lock members to slide a given extent, in each of said lock members notches are formed to cancel a locked relation of said lock member with said pawls as said lock member slides a given extent, and a stopper is incorporated for preventing sliding of said lock members in a normal state.

2. A housing of a booster device as set forth in claim 1, wherein said second shell has a shoulder portion positioned on the side of the inner periphery of said lock members, and said stopper is a bendable projection extending from the inner periphery at the central portion of said lock member toward said shoulder portion of said second shell.

3. A housing of a booster device as set forth in claim 1, wherein said stopper is a spacer made of elastic material interposed between the opposite ends of said lock members.

* * * * *